US006550652B2

(12) United States Patent
Whitaker

(10) Patent No.: US 6,550,652 B2
(45) Date of Patent: Apr. 22, 2003

(54) PATCH ASSEMBLY FOR USE ON LIVE ANIMALS

(75) Inventor: Robert E. Whitaker, Lafayette, CO (US)

(73) Assignee: DDx, Inc., Denver, CO (US)

( * ) Notice: Subject to any disclaimer, the term of this patent is extended or adjusted under 35 U.S.C. 154(b) by 0 days.

(21) Appl. No.: 09/853,124

(22) Filed: May 9, 2001

(65) Prior Publication Data

US 2002/0026124 A1 Feb. 28, 2002

Related U.S. Application Data

(63) Continuation of application No. 09/292,792, filed on Apr. 14, 1999, now abandoned, which is a continuation-in-part of application No. 09/053,958, filed on Apr. 2, 1998, now abandoned.

(51) Int. Cl.[7] ................................................ A61B 10/00
(52) U.S. Cl. ........................ 224/191; 224/901; 600/551
(58) Field of Search .................. 224/901, 905, 224/191; 119/858; 600/551

(56) References Cited

U.S. PATENT DOCUMENTS

| 3,158,133 A | * | 11/1964 | Larson | 600/551 |
|---|---|---|---|---|
| 3,205,857 A | * | 9/1965 | Larson | 600/551 |
| 3,942,475 A | * | 3/1976 | Wassilieff et al. | 600/551 |
| 4,239,018 A | * | 12/1980 | Griffin et al. | 600/551 |
| 4,450,844 A |  | 5/1984 | Quisno | 128/743 |
| 4,635,587 A | * | 1/1987 | Leonardo | 340/573.3 |
| 4,709,695 A |  | 12/1987 | Kohn et al. | 128/132 R |
| 4,745,916 A | * | 5/1988 | Seber | 128/858 |
| 4,846,106 A | * | 7/1989 | Leonardo | 600/551 |
| 4,895,165 A | * | 1/1990 | Blair | 600/551 |
| 5,542,431 A |  | 8/1996 | Starzl et al. | 128/738 |
| 5,566,679 A | * | 10/1996 | Herriott | 600/551 |
| 5,839,390 A | * | 11/1998 | Meads | 119/174 |
| 5,881,673 A | * | 3/1999 | Beach et al. | 119/174 |
| 6,006,697 A | * | 12/1999 | Sullwold | 119/174 |

* cited by examiner

Primary Examiner—Stephen P. Garbe
(74) Attorney, Agent, or Firm—Dorsey & Whitney LLP

(57) ABSTRACT

A patch assembly having pre-applied pressure sensitive adhesive for semipermanent attachment to a live animal is described. This assembly permits the easy and clean attachment thereof to live animal. Further, the assembly prevents skin irritations while maintaining superior bond strength and, in turn, remaining intact and attached to the animal for extended periods of time. The invention may be used, for example, for device attachment to human and non-human animals.

9 Claims, 4 Drawing Sheets

PATCH ASSEMBLY FOR USE ON LIVE ANIMALS

RELATED APPLICATIONS

This application is a continuation of U.S. patent application Ser. No. 09/292,792, filed Apr. 14, 1999, now abandoned, which is a continuation-in-part of U.S. patent application Ser. No. 09/053,958, filed Apr. 2, 1998, now abandoned. The contents of the above-identified patent applications are hereby incorporated by reference as if fully disclosed herein.

FIELD OF THE INVENTION

This invention relates to the general field of adhesive patches, specifically, to a patch assembly having a device retaining housing, and more specifically, for retaining a radio transmitter or other device securely to a live animal. This application, thus, describes a composite textile fabric patch assembly having a pouch-type housing disposed thereon, capable of securely housing a radio transmitter or the like; said patch being detachably and/or semi-permanently mounted to the animal via pre-applied, pressure sensitive adhesive.

BACKGROUND AND PRIOR ART

It is not uncommon to monitor via radio frequency and the like, not only humans but non-human animals, for a number of reasons. For example, non-human animals are monitored for breeding status and humans are monitored for birthing status. This invention is generally directed to and discussed in terms of the animal husbandry industry for ease of understanding, but is not limited or intended to be limited to such.

A current standard for ensuring breed backs and the like in the cattle industry is the use of artificial insemination (AI) of cows. In order to achieve a high success rate using AI, it is necessary to inseminate the cow during standing heat. Generally, cows are classified as in standing heat and ready for breeding when they submit to being mounted by other cows. One way of determining a standing heat is to have ranch hands, in shifts, observe the herd, pull the cows that appear to be in standing heat and inseminate them. In recent years, technology has provided alternatives to reliance on the human eye for 24-hour observation, for example, the HeatWatch® system (U.S. Pat. No. 5,542,431 to Starzl et al.). This alternative includes the transfer of pertinent information via radio frequency (RF) broadcast from individual cows to a remote location for evaluation and action thereon. One aspect of the system is the attachment of a radio frequency transmitter to the tailhead of each cow. Attachment of this and/or other apparatuses to the tail-heads of cows has been achieved in the past with crude patches that are cemented to a cow with what is generally referred to as livestock glue.

In their simplest form, prior art patch systems comprise absorbent patches of woven or non-woven synthetic or natural fibers affixed directly to an adhesive tape or placed on a section of the animal previously coated with standard cement. Neither the tape nor the cement adheres well to flexible, hair-growing human or non-human animal skin, particularly in the presence of water, perspiration, or the like. Further, adhesives and tapes can be irritating to skin due to their complete occlusion of oxygen or, alternatively, due to gapping such that the patch system is non-occlusive and falls off the animal.

In an attempt to provide a superior patch system, prior art has been developed that includes various types of housings and adhesives. U.S. Pat. No. 4,450,844 to Quisno, entitled PATCH SYSTEM FOR USE ON THE SKIN, is directed to a patch system for use on skin. More specifically, a patch having a housing used on human or animal skin for predictive or diagnostic testing or dermal drug delivery and having adhesive coated tape by which it is attached to skin.

U.S. Pat. No. 4,911,156 to Libertucci, entitled ELASTIC LEG WRAP FOR HORSES, is directed to improved horse leg wraps employing elastic strips interspersed with nylon webbing. Said wrap is significantly lighter than prior art when saturated and resists sliding off of a live animal.

Next, a METHOD AND SUBSTANCE FOR THE DETECTION OF COWS IN ESTRUS is disclosed in U.S. Pat. No. 4,696,258 to Magrath et al. Microencapsulated substances for detecting standing heat without the use of patches are described and reference the prior use of inferior fabric patches cemented to the rumps of cows.

The Herriott patent, U.S. Pat. No. 5,566,679 entitled METHODS FOR MANAGING THE REPRODUCTIVE STATUS OF AN ANIMAL USING COLOR HEAT MOUNT DETECTORS is directed to a detection patch that is cemented to a cow's back or tailhead. Said detection patch contains chemicals within pressure responsive receptacles that produce a chemiluminescent reaction when activated.

U.S. Pat. No. 846,106 to Leonardo, entitled METHOD AND APPARATUS FOR DETECTING STANDING HEAT IN CATTLE, is an apparatus adapted to be adhered by adhesive to the base of the tail of a cow. A salient feature of the invention is the provision of a sleeve adapted to retain the assembly of the modular housing and the switch, and to secure the assembly to a cow with an acceptable livestock adhesive. The sleeve is made of plastic layers secured to a polyester backing, and joined to a base sheet of nylon mesh material via perimeter stitching. For attachment to the cow, the nylon base sheet becomes enmeshed in the livestock adhesive applied to the cow.

The most relevant prior art, describing two estrus detection systems using cemented patches, includes a CATTLE STANDING HEAT DETECTOR disclosed in U.S. Pat. No. 3,158,134 to Larson and a METHOD AND DEVICE FOR DETECTING PERIOD OF HEAT IN COWS as described in U.S. Pat. No. 3,076,431 to Rule et al. Larson discloses a patch base portion having upper and lower surfaces and a housing assembly disposed on one of those surfaces. Said patch is cemented in place on a cow. Larson does not disclose the pre-application of adhesive to the patch base surface opposite the housing assembly. Rule et al. disclose the use of non-setting type adhesive or cement for patch application to a live animal. Non-setting adhesives, however, are inappropriate for extended periods of attachment. Shortcomings found in the prior art include, for example, the inability to retain a patch assembly on an animal for a specified and/or extended period of time, and difficulty of application of patch assemblies. Further, current patch assembly adhesives pull out hair, create skin irritations and allow microbial growth thereunder.

The present invention overcomes these drawbacks by providing a self-adhesive patch adapted for semi-permanent attachment to living human and non-human animals. The assembly of the instant invention is highly suitable for the above-stated purposes as it is made from laminated elastic textile fabric having flexible and breathable characteristics, for example, Goretex® and Darlexx®, and has factory-applied (preapplied), quick-setting, pressure sensitive adhesive disposed thereon. The patch assembly of the instant invention may be constructed from any number of materials, for example, nylon, canvas, fabric or other similar materials or combinations of such materials.

In the preferred embodiment, a commercially available, composite textile fabric combining two or more materials having different, yet essential, characteristics is employed; in combination, each material retains its identity while contributing necessary characteristics, such as flexibility and breathability, to the textile as a whole. More specifically, said composite textile fabrics may be constructed from synthetic fibers and/or filaments and are generally useful in the industrial arts. Additional examples of textiles include Lycra®, Nylon®, Dacron® and Orlon®.

While prior art is suitable for short term patch assembly attachment, notwithstanding skin irritations and the like, none of the prior art can easily and quickly be applied to a live animal, nor does it provide the necessary adhesive bond strength. The present invention provides a pressure sensitive adhesive formulated to possess a quick setting time, having superior bond strength, and in turn, superior attachment and extended retention of patch assemblies to live animals. This invention, thus, provides a patch assembly having a device retaining housing, said assembly adapted for simple, clean attachment to a live animal and possessing an extended shelf-life prior to use obviating the necessity to store and/or apply adhesives to either the animal or the patch.

SUMMARY OF THE INVENTION

This invention is based on a novel concept for the attachment of patch assemblies to live animals, for example, patches having device retaining housings, e.g., pockets for safely retaining radio transmitters.

The present invention, when practiced as disclosed herein, provides a novel patch assembly adapted to securely adhere to human and non-human animals for lengthy periods. Adhesives employed herewith are applicable to all patch assemblies for semi-permanent attachment to non-human animals, as well as patch assembly attachment to human skin. The instant invention, thus, is useful for semi-permanent attachment of a device to the skin of a living animal, but is not intended to be limited to this use.

In its broadest terms, the patch assembly disclosed herein is comprised of a base portion having a device retaining housing mounted thereon, and having pressure sensitive adhesive pre-applied to the opposite surface of said base portion. More specifically, the instant invention comprises a patch assembly constructed of composite textile fabric having at least the characteristics of flexibility and breathability, adapted for easy and neat application to a living animal's tailhead, or other body part. That application is accomplished by removing release paper covering the adhesive, positioning the patch assembly and applying pressure.

Accordingly, it is an object of the invention to effectively reduce labor, skill and mess in the application of patch assemblies to live animals. That is, adapt said patch assembly for easy, clean manipulation. An additional object of the present invention is to provide patch assemblies with pressure sensitive adhesive having sufficient bond strength to remain in place for extended periods. Further, the patch assembly of the present invention is more aesthetically pleasing in appearance than that of the prior art patch assemblies.

The instant invention works well, even in the presence of moisture or movement. Said composite materials include, for example, elastomers, rubbers, polymers, plastics and derivatives thereof. The patch assembly of the present invention has numerous applications, however, all embodiments of the instant invention include the same general methodologies, objects and elements: patch assemblies, including a device retaining housing, having pressure sensitive adhesive disposed thereon for mounting on a live animal, and may further comprise certain customizing features and specifications. The patch assembly of the present invention has numerous applications and is suitable for use both with humans and non-human animals.

Other features and advantages of the present invention will become apparent from the following detailed description, taken in conjunction with the accompanying figures, that illustrate by way of example, the principles of the instant invention.

BRIEF DESCRIPTION OF THE DRAWINGS

FIG. 2a illustrates the upper portion of the device retaining housing assembly, and FIG. 2b, the lower portion of the housing assembly.

FIG. 2c depicts the engagement of the upper and lower portions of the housing assembly having a device retained therein.

DETAILED DESCRIPTION OF THE PREFERRED EMBODIMENT

Figure 1:
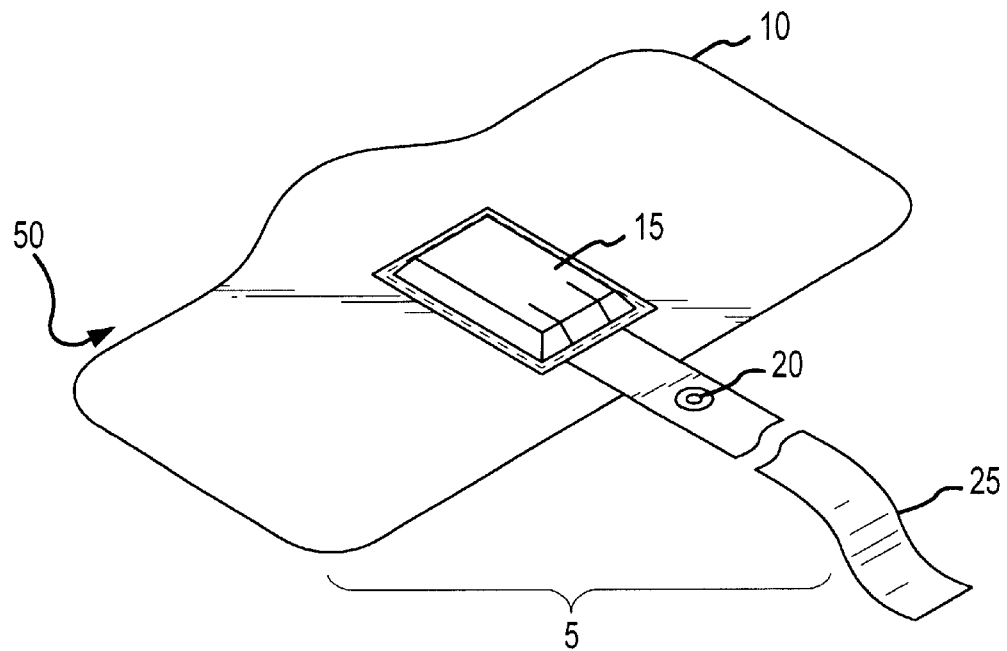
FIG. 1 is an isometric view of the preferred embodiment of the patch assembly.

It is to be understood that both the foregoing general description and the following detailed description are exemplary and explanatory only and are not restrictive of the invention, as claimed. The present invention provides a patch system useful for easy semi-permanent attachment to the skin of a human or non-human animal subject, as well as retaining a device within a housing mounted thereon. It is recognized by those skilled in the art that a broad range of patch assemblies and adhesive formulations may be practiced in accordance with the presently disclosed invention.

The concept of a factory-applied "peel and stick" adhesive patches to retain a device on an animal, for example, the tail-head of a cow, responds to industry need. In current use are cloth or plastic patches that are glued to the tail-head of a cow using non-setting, solvent-based "sale-tag adhesive" which is dispensed from a tube equipped with a nozzle. This patch adhesive system has proven to be reasonably satisfactory in current applications throughout the U.S. and in several foreign countries. However, this method is messy, time-consuming, and requires reasonably careful and skilled application to achieve the required retention period. That is, the amount of time the patch is retained on the animal without reapplication. Even then, in high temperatures or when significant moisture is present, retention is a problem.

Originally, patches employed, for example in conjunction with HeatWatch® (DDx, Inc., Denver, Colo.) were constructed of burlap fabric which fell apart; especially under conditions of excessive moisture. The next generation of patches were constructed of polyester mesh with pouches produced from Cordura® yarn, or the like. Since conception, several types of adhesives and many patch materials have been tried. Specifically, latex-based adhesives were tried and rejected due to long curing time. Several hot-melt or pressure-sensitive formulations were tried and rejected due to lack of bond strength.

With the instant invention, a number of individual adhesives and combinations of factory-applied hot-melt adhesive and spray-on solvent-based adhesive are employed with patches constructed of laminated elastic textile fabrics. The present invention is directed to a patch assembly intended to overcome the deficiencies of prior art patch assemblies. This is accomplished by novel means of patch attachment to a live animal and by virtue of the fact that the assembly is made of breathable and flexible material, on which quick-setting, pressure sensitive adhesive has been applied, the combination of which facilitates the extended retention thereof. Moreover, ancillary methods of retention are included herein, for example, hog ring attachments and tail-loops. The present invention provides a patch assembly having quick-setting, pressure sensitive adhesive with superior bond strength on one surface and a device retaining housing on the opposite surface thereof, useful for attachment to a live animal.

Referring first to FIG. 1, the details of the basic structure of the preferred embodiment of the invention include two major portions: a patch assembly 5, including a device retaining housing 15 mounted on a patch base 10; and, a peel-and-stick pressure sensitive adhesive 50. In a preferred embodiment of the present invention, the patch base 10 is generally rectangular in shape having a device housing 15 centrally disposed on its surface or, alternatively, integrally formed and extending therefrom, and a preapplied pressure sensitive adhesive 50 on the opposite surface from said housing 15. This patch assembly 5 retains within its housing 15 a radio transmitter or other device securely on a cow or other animal. The patch base 10 is comprised of composite textile fabric, for example, fabric with polytetrafluoroethylene laminate, or like laminated elastic textile fabrics having knit flexible backings; said assembly further comprises a housing 15 constructed of synthetic yarns, for example, Cordura® or other like material, generally centered on the patch base 10. Said housing 15 may be sewn onto the patch base 10 or integrally formed therefrom as discussed supra. Also, optionally included in the patch assembly 5 are ancillary retention features. For example, a tail strap 25 which is either taped onto the animals's tail or fastened with a wire or cord through a grommet 20 in the tail strap and a hog ring inserted through the animal's skin. These features may steady the patch assembly 5 and, in fact, maintain it on the animal in the event the assembly becomes dislodged from the animal. The tail strap 25 retains the patch on the animal if it comes loose from its glued-on position.

The base of the patch lends itself well to being composed of a composite fabric material having the characteristics of flexibility and breathableness. For example, any number of textiles in the laminated elastic textile fabric group may be used. As a non-limiting example, excellent results have been achieved with the composite material sold under the trademarks Gore-tex® and Darlexx®.

Figure 2A:
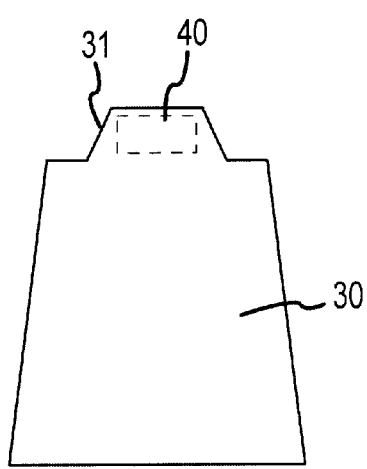
FIGS. 2a, 2b and 2c are exploded views of the housing assembly; depicting the individual parts thereof and their relationship to one another.
Figure 2B:
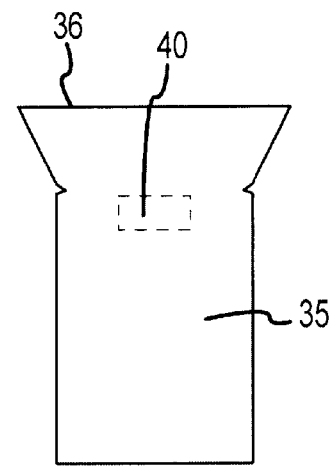
Figure 2C:
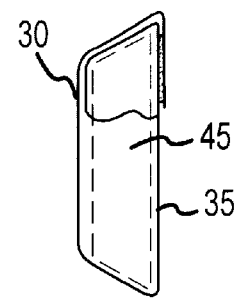

The preferred embodiment of the housing assembly 15, as shown in FIGS. 2a, 2b, and 2c, is comprised of an upper portion 30, a lower portion 35 and at least one fastener 40, for example, the hook-and-loop type fastener marketed under the name Velcro®. The upper portion 30 having a generally rhomboid shape presents an inverted rhomboid-shaped, planar flange 31 from its shorter, parallel side; disposed and mounted in a generally central area of the flange, on the internal surface, is a segment of hook-and-loop fastener 40, either hook or loop portion. See FIG. 2a. A generally rectangular-shaped piece of fabric having a rhombus-shaped, planar flange 36 extending therefrom, the shorter parallel side integrally formed from the rectangle's short side, forms the lower portion 35 of the housing assembly 15 (FIG. 2b); disposed and mounted in a generally central area at the point of flange integration, on the external surface, is a segment of hook-and-loop fastener 40 portion functionally corresponding to that of the upper housing portion 30. Said flanges 31, 36, functionally interfold with one another, one over the other, thereby engaging said fastener segments, closing and sealing the housing 15 from external influences (FIG. 2c); said lower flange 36 inserts into the housing 15 and over the device 45 housed therein, said upper flange 31, in turn, inserting under lower flange 36, engaging the corresponding hook-and-loop fastener portions 40.

Figure 3:
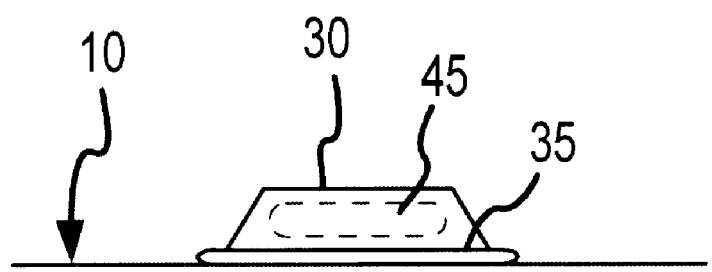
FIG. 3 depicts a lateral cross-sectional view of the patch assembly.

FIG. 3 shows a lateral cross-section of the patch assembly, subsequent to the previously described housing assembly 15 engagement. The three, remaining peripheral edges of both the upper 30 and lower portion 35 of the housing assembly 15 are continuously connected or affixed to one another, for example, by stitching or sealing, so as to define a housing assembly 15 having three closed or sealed peripheral edges and one open peripheral edge for receiving and securely retaining a device. Said unaffixed peripheral edges providing an opening allowing insertion or removal of a device; once a device is placed inside the housing 15, the opening is sealed as described. Prior to insertion of a device, said housing assembly 15 is mounted in a generally central location on said patch base portion 10 by, for example, cementing or preferably stitching it thereto.

Figure 4:
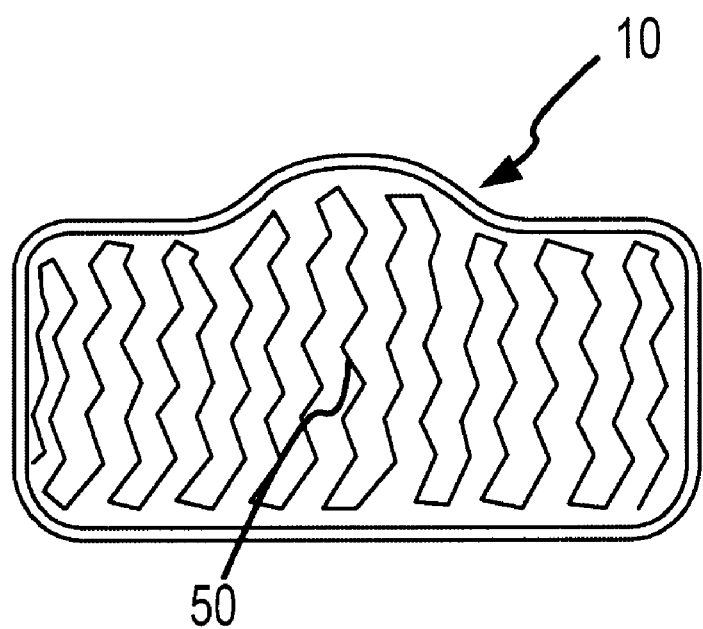
FIG. 4 shows the surface of the composite patch section of the patch assembly having pressure sensitive adhesive disposed thereon in a pattern facilitating the flexibility and breathability of the patch assembly.
Figure 5:
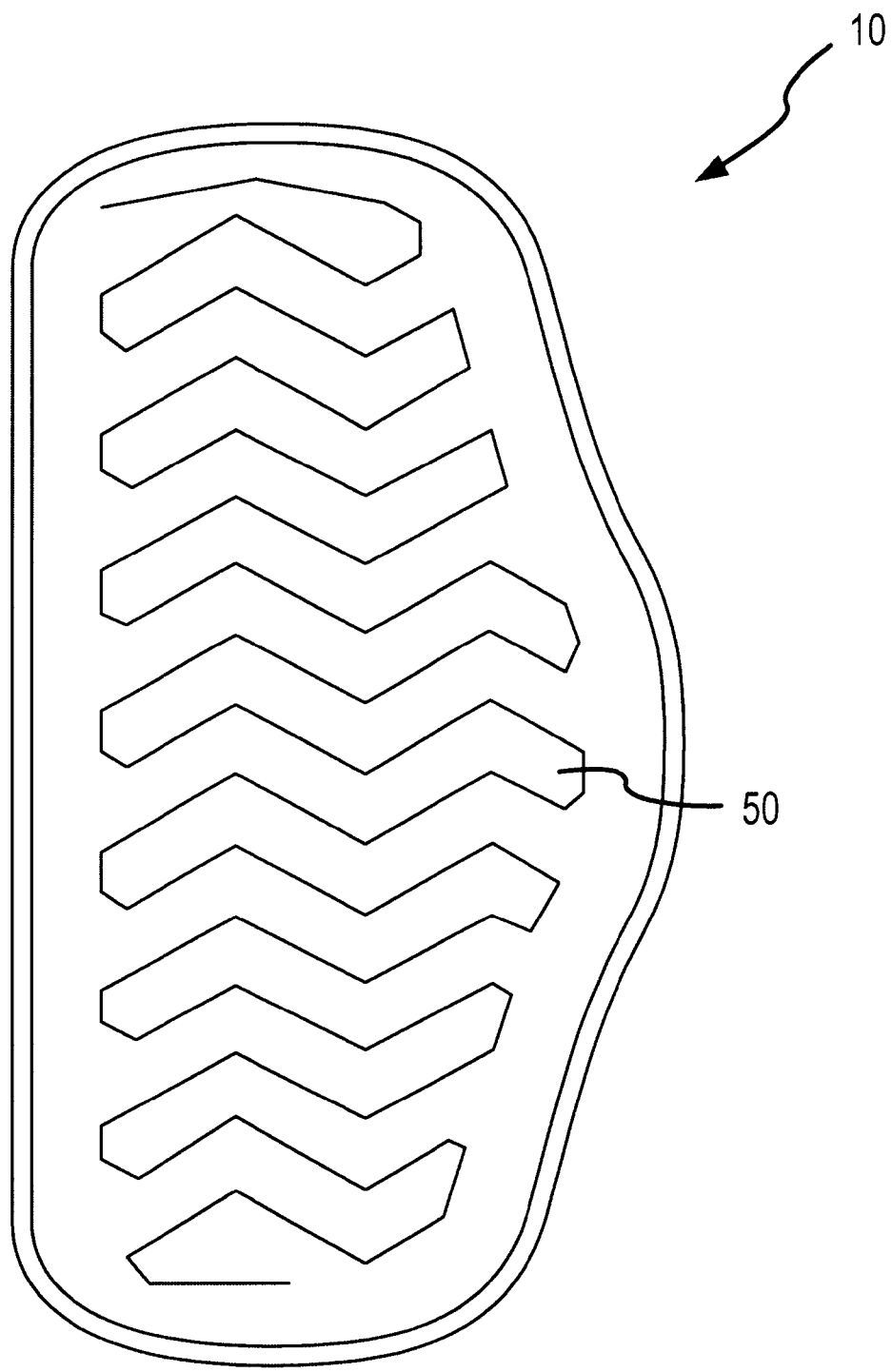
FIG. 5 shows the surface of the composite patch section of the patch assembly having pressure sensitive adhesive disposed thereon, depicting an alternate adhesive pattern shown to facilitate the flexibility and breathability of the patch assembly.
Figure 6:
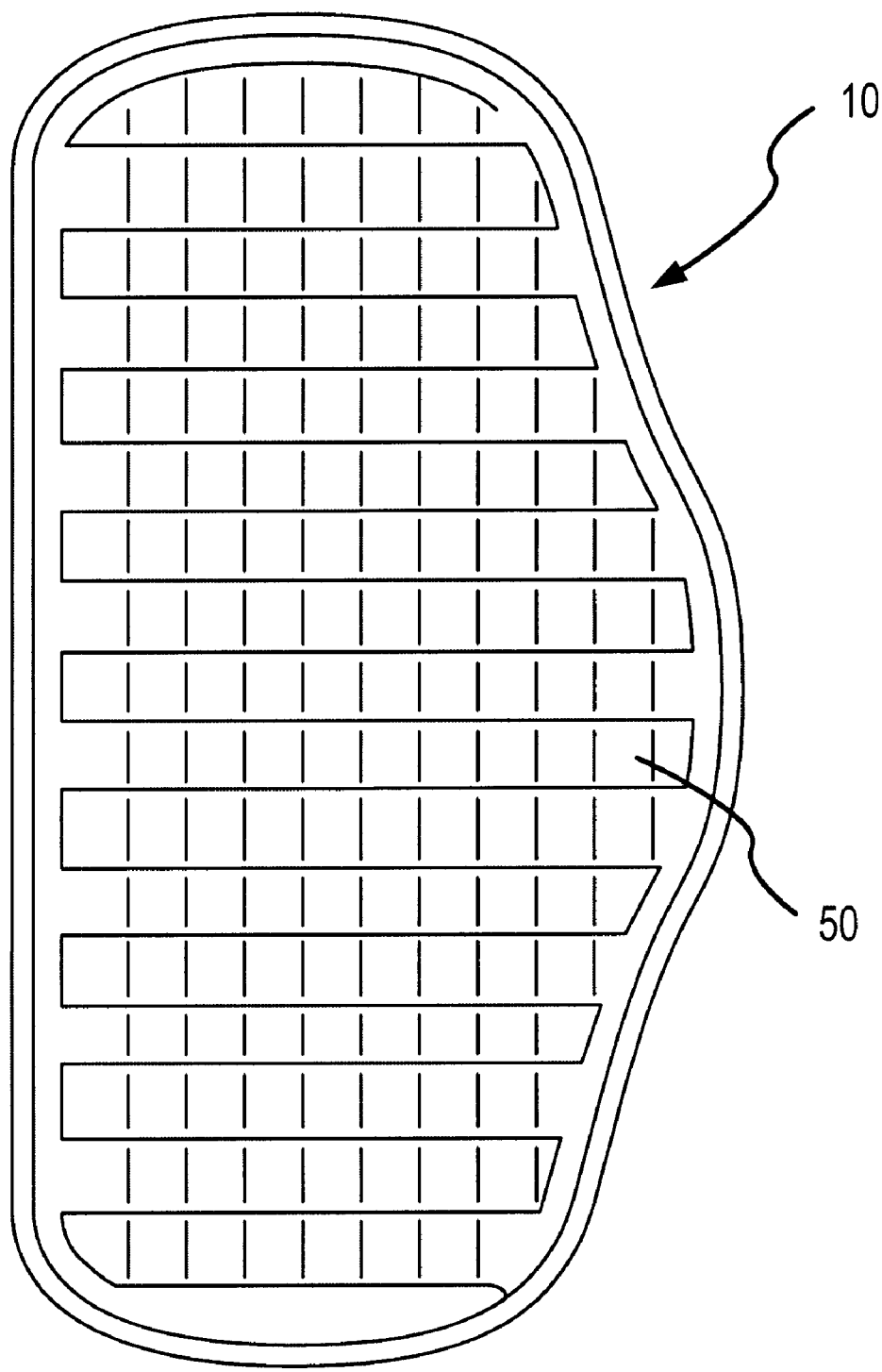
FIG. 6 shows the surface of the composite patch section of the patch assembly having pressure sensitive adhesive disposed thereon in yet another useful pattern.

On the patch base 10 surface opposite the housing assembly 15 is adhesive 50 for use in application of the patch assembly 5 to an animal. See FIG. 4. The adhesive used is, in general, a solvent-based hot-melt pressure-sensitive type adhesive such as Bostik H/M 9068 (Bostik Inc., Middleton, Mass.). The adhesive is applied in a specific pattern by an electronic glue dispensing device, specifically adapted for such application, by manipulating dispensing nozzles via computer-controlled positioning devices. The application pattern is closely controlled and may be varied, through computer programming, to produce any number of alternative patterns altering the percentage of area of adhesive versus the percentage of area enabling air flow, see, for examples, FIGS. 4, 5 and 6. By creating a pattern of adhesive, as opposed to a single, solid layer of adhesive, air and water vapor are able to migrate to and from the skin facilitating patch retention. Moreover, the elastically deformable patch fabric allows water vapor to pass through while blocking the passage of fluid to the skin surface. That is, the patch assembly allows air to reach the skin surface, while shedding fluid therefrom and/or enabling the transfer of vapors away therefrom.

Prior to use, the pressure sensitive adhesive may be protected with a removable release paper facilitating storage and/or transport. Release paper may be of any appropriate type, suitable or adapted for use with the particular application to which the patch assembly is directed. Generally, papers coated with polyethylene silicone, paraffin wax or aluminum foil provide excellent results. Said configuration insures long-shelf life of the assembly; significantly longer, with or without release paper, than conventional livestock glue preparations. In use, the patch assembly is attached to the animal, for example a cow, by first cleaning the hide of loose hair, dander, dirt and other particles. Then a thin layer of adhesive activator, such as contact type aerosol adhesive, is sprayed evenly onto the tailhead to provide a base for the patch and to activate the adhesive on the patch. An optional coat of activator may be sprayed directly onto the patch itself. Allow the activator to set for approximately 1 minute—that is, dry until not sticky to the touch. If not already removed, remove the release paper from the patch and position and apply the patch to the cow, pressing it into place using either finger pressure or a small roller. Finally, attach tail strap and hog ring in a standard method.

It is apparent that the present invention provides a method and means for mounting and easily retaining a radio transmitter or other device to a live animal. Furthermore, the instant invention may clearly be practiced in conjunction with any type of device to be retained on an animal, i.e., identification, location, bodily functions. While specific embodiments of the invention have been illustrated and described herein, these should not be construed as limitations on the scope of the invention, but rather an exemplification of the preferred embodiments thereof. Numerous variations are possible and will occur to those skilled in the art. It is therefore to be understood that the appended claims are intended to cover all such modifications and changes as fall within the true spirit and scope of the invention.

I claim:

1. An adhesive patch assembly for attachment to live animals, the patch assembly comprising:
   a patch base portion composed of an air and water vapor permeable material, the patch base portion having two patch surfaces;
   a housing assembly centrally disposed on one of said patch surfaces; and
   a non-continuous layer of pressure sensitive adhesive pre-applied over said patch surface opposite said housing assembly sufficient for adhesion of the adhesive patch assembly to the live animal;
   wherein the flow of air and water vapor through the patch base portion is facilitated by utilizing the non-continuous layer of pressure sensitive adhesive in combination with the base portion being composed of an air and water vapor permeable material.

2. The adhesive patch assembly claimed in claim 1, further comprising a layer of release paper disposed over said adhesive.

3. The adhesive patch assembly claimed in claim 2, wherein said layer of release paper is a paper coated with a member selected from the group consisting of: polyethylene silicone, paraffin wax, and aluminum foil.

4. The adhesive patch assembly as claimed in claim 1, wherein said patch base portion is comprised of a laminated elastic textile fabric.

5. An adhesive patch assembly for attachment to live animals, the patch assembly comprising:
   a patch base portion composed of an air and water vapor permeable material, the patch base portion having two patch surfaces;
   a housing assembly centrally disposed on one of said patch surfaces;
   a non-continuous layer of adhesive pre-applied over said patch surface opposite said housing assembly for adhesion of the adhesive patch assembly to the live animal; and
   an electronic estrus detecting device disposed within said housing assembly;
   wherein the flow of air and water vapor through the patch base portion is facilitated by utilizing the non-continuous layer of adhesive in combination with the base portion composed of an air and water vapor permeable material.

6. The adhesive patch assembly as claimed in claim 5, further comprising:
   a layer of release paper disposed over said adhesive, said layer of release paper capable of being removed from said patch assembly prior to attachment to said live animal.

7. The adhesive patch assembly as claimed in claim 5, wherein said patch base portion is comprised of a laminated elastic textile fabric.

8. The adhesive patch assembly as claimed in claim 5, wherein said estrus detecting device is a radio transmitter.

9. A method for attaching an estrus detecting device to a live animal comprising the steps of
   obtaining a patch assembly having an air and water vapor permeable patch base portion having two surfaces, a housing assembly centrally disposed on one of said patch surfaces, a pressure sensitive adhesive pre-applied over only a portion of said patch surface opposite said housing assembly and an estrus detecting device within said housing; and
   applying said patch assembly to said live animal by activating said pre-applied adhesive and pressing said patch assembly to said live animal, wherein the flow of air and water vapor through the patch base portion is facilitated by utilizing a non-solid layer of pressure sensitive adhesive in combination with the base portion composed of an air and water vapor permeable material.

* * * * *